United States Patent
Golding

(10) Patent No.: US 11,886,816 B2
(45) Date of Patent: Jan. 30, 2024

(54) BOT DIALOG MANAGER

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

(*) Notice: Subject to any disclaimer, the term of this patent is extended or adjusted under 35 U.S.C. 154(b) by 146 days.

(21) Appl. No.: 17/182,217

(22) Filed: Feb. 22, 2021

(65) Prior Publication Data

US 2021/0264112 A1  Aug. 26, 2021

Related U.S. Application Data

(60) Provisional application No. 62/981,352, filed on Feb. 25, 2020.

(51) Int. Cl.
*G06F 40/284* (2020.01)
*G06F 40/289* (2020.01)

(52) U.S. Cl.
CPC .......... *G06F 40/284* (2020.01); *G06F 40/289* (2020.01)

(58) Field of Classification Search
CPC ...... G06F 40/284; G06F 40/289; G06F 40/30; G06F 40/35; G06N 3/0445; G06N 3/0454; G06N 3/08
See application file for complete search history.

(56) References Cited

U.S. PATENT DOCUMENTS

| | | | | |
|---|---|---|---|---|
| 10,388,272 | B1* | 8/2019 | Thomson | G10L 15/22 |
| 2005/0071152 | A1* | 3/2005 | Morimoto | G06F 40/279 |
| | | | | 704/10 |
| 2010/0145678 | A1* | 6/2010 | Csomai | G06F 40/169 |
| | | | | 704/10 |
| 2015/0242386 | A1* | 8/2015 | Moreno Mengibar | |
| | | | | G06F 40/232 |
| | | | | 704/235 |

(Continued)

FOREIGN PATENT DOCUMENTS

| | | | | |
|---|---|---|---|---|
| CN | 111144110 A | * | 5/2020 | |
| WO | WO-2008109781 A2 | * | 9/2008 | G06F 17/27 |
| WO | WO-2016200359 A1 | * | 12/2016 | |

OTHER PUBLICATIONS

Wang, Feixiang, Zhihua Zhang, and Man Lan. "Ecnu at semeval-2016 task 7: An enhanced supervised learning method for lexicon sentiment intensity ranking." Proceedings of the 10th International Workshop on Semantic Evaluation (SemEval-2016). 2016. (https://aclanthology.org/S16-1080.pdf) (Year: 2016).*

(Continued)

*Primary Examiner* — Pierre Louis Desir
*Assistant Examiner* — Keisha Y. Castillo-Torres
(74) *Attorney, Agent, or Firm* — FERGUSON BRASWELL FRASER KUBASTA PC

(57) ABSTRACT

A method manages bot dialogue. A user input is converted to a phrase vector. A set of identified tokens are identified by a token identification engine from the phrase vector. An unsupervised token is selected from the set of identified tokens. A supervised token is selected from the set of identified tokens. A voted token selected from the unsupervised token and the supervised token. A next token is identified based on a set of recent tokens that includes the voted token. The next token is presented as one of a voice communication and an email communication.

20 Claims, 8 Drawing Sheets

(56) References Cited

U.S. PATENT DOCUMENTS

| | | | | |
|---|---|---|---|---|
| 2017/0053024 | A1* | 2/2017 | Forman | G06N 20/00 |
| 2018/0018971 | A1* | 1/2018 | Park | G06F 16/243 |
| 2019/0043490 | A1* | 2/2019 | Rivlin | G10L 15/197 |
| 2019/0130305 | A1* | 5/2019 | Sivertson | G06N 5/01 |
| 2019/0138595 | A1* | 5/2019 | Galitsky | G06N 20/10 |
| 2019/0205372 | A1* | 7/2019 | Li | G06F 40/232 |
| 2020/0134019 | A1* | 4/2020 | Podgorny | G06N 3/044 |
| 2020/0134627 | A1* | 4/2020 | Hamooni | G06Q 20/4016 |
| 2021/0209301 | A1* | 7/2021 | Gupta | G06F 40/289 |

OTHER PUBLICATIONS

Wang, Feixiang, et al. "Ecnu at semeval-2016 task 7: An enhanced supervised learning method for lexicon sentiment intensity ranking." Proceedings of the 10th International Workshop on Semantic Evaluation (SemEval-2016). 2016. (htttps://aclanthology.org/S16-1080.pdf). (Year: 2016).*

* cited by examiner

Window 300

| | | | |
|---|---|---|---|
| 301 | user: | hi | #heloc #loan #greeting  320 |
| 302 | bot: | hi - who am I talking to? | #heloc #loan #request |
| 303 | user: | bob | #heloc #loan #name |
| 304 | bot: | bob - how can I help? | #heloc #loan #initiation |
| 305 | user: | I'd like to borrow some money | #heloc #loan #request |
| 306 | bot: | how much? | #heloc #loan #amount |
| 307 | user: | 5000 | #heloc #loan #amount |
| 308 | bot: | do you own a home? | #heloc #loan #home #ownership |
| 309 | user: | yes | #heloc #loan #affirmation |
| 310 | bot: | you might qualify for a heloc | #heloc #loan #identify_task |
| 311 | bot: | would you like me to check | #heloc #loan #continue |
| 312 | user: | will it take long? | #heloc #loan #howlong |
| 313 | bot: | about 5 minutes | #heloc #loan #duration  321 |

Path state  330

331  applicant:  bob
332  task:       check_equity
333  amount:     5000
334  path:       A
335  state:      5

*Figure 3A*

BOT DIALOG MANAGER

CROSS REFERENCE TO RELATED APPLICATIONS

This application claims the benefit of priority to U.S. Provisional Application 62/981,352, filed Feb. 25, 2020, which is hereby incorporated by reference herein.

BACKGROUND

Interactive voice response systems (as well as chat bots and other interactive systems) respond to natural language user inputs to perform tasks for a user. For example, a user may call a financial services provider to inquire about a loan and get a quote. Phrases can have different meanings and be related to different tasks based on the context of the dialog between the user and the system, which may not be present in each natural language user input. A challenge is to provide contextually relevant responses and outputs to perform tasks based on the natural language user input.

SUMMARY

In general, in one or more aspects, the disclosure relates to a method that manages bot dialogue. A user input is converted to a phrase vector. A set of identified tokens are identified by a token identification engine from the phrase vector. An unsupervised token is selected from the set of identified tokens. A supervised token is selected from the set of identified tokens. A voted token selected from the unsupervised token and the supervised token. A next token is identified based on a set of recent tokens that includes the voted token. The next token is presented as one of a voice communication and an email communication.

In general, in one or more aspects, the disclosure relates to a system that includes a processor and a memory coupled to the processor. The memory includes an application that executes on the processor and is configured for managing bot dialogue. A user input is converted to a phrase vector. A set of identified tokens are identified by a token identification engine from the phrase vector. An unsupervised token is selected from the set of identified tokens. A supervised token is selected from the set of identified tokens. A voted token selected from the unsupervised token and the supervised token. A next token is identified based on a set of recent tokens that includes the voted token. The next token is presented as one of a voice communication and an email communication.

In general, in one or more aspects, the disclosure relates to non-transitory computer readable mediums that include computer readable program code for managing bot dialogue. A user input is converted to a phrase vector. A set of identified tokens are identified by a token identification engine from the phrase vector. An unsupervised token is selected from the set of identified tokens. A supervised token is selected from the set of identified tokens. A voted token selected from the unsupervised token and the supervised token. A next token is identified based on a set of recent tokens that includes the voted token. The next token is presented as one of a voice communication and an email communication.

Other aspects of the invention will be apparent from the following description and the appended claims.

BRIEF DESCRIPTION OF DRAWINGS

FIG. 3A and FIG. 3B show examples in accordance with disclosed embodiments.

DETAILED DESCRIPTION

Figure 1A:
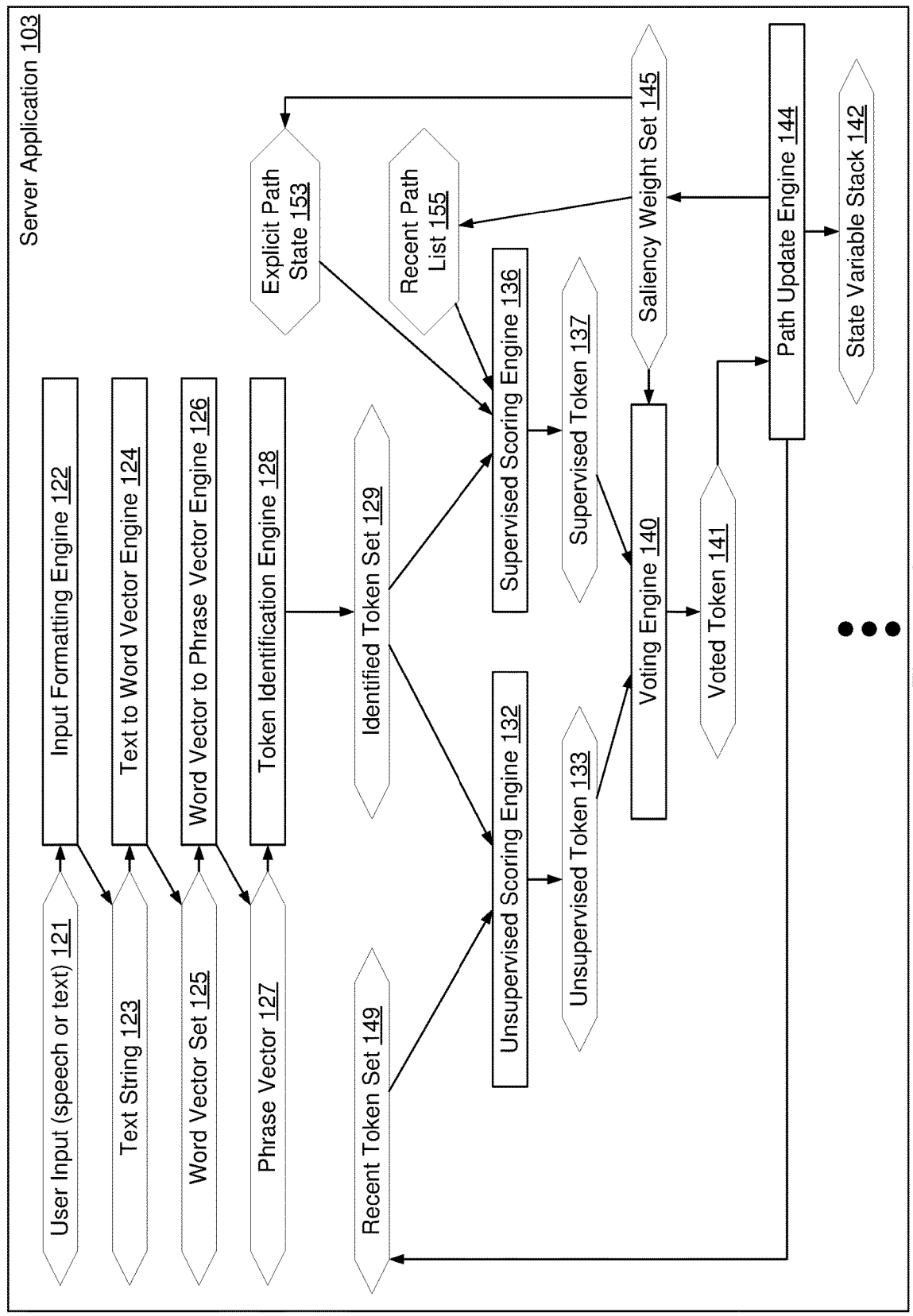
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, disclosed embodiments allow a user to perform tasks with a system that identifies the context of user inputs based on the recent inputs and responses to and from the system. For example, a user may call into the system and ask "how long will it take?" when asking about the loan application process. This user input itself does not fully identify the context and could be used to ask for the expected duration of any number of tasks that may be performed by the system. To identify the context, the system may use tokens to identify multiple user inputs (i.e., questions and phrases spoken or otherwise supplied by a user) that are similar. The system tracks recent tokens (questions, phrases, and responses), which are used to determine the current context of a user input.

Additionally, the different tasks that may be performed by the system may each be associated with a path. A path is a sequence of tokens that accomplish a task. For example, when a user calls to inquire about a loan, the path to get prequalified for a loan may require the user to provide contact information and financial data that is used by the system to determine if the user may be prequalified. Each step along the path may correspond to a response from the user and a response from the system to the user to answer questions using natural language and gather the required information.

While interacting with the system, a user may switch between different tasks and paths. For example, a user may initially inquire about a loan, but then switch to inquiring about a home equity line of credit. The system tracks the dialog with the user, tokenizes the responses that are sent back and forth between the user and the system, tracks the state of the path that the user is on, and provides contextually relevant responses.

Additionally, the system may switch between different types of communication to continue a dialog with a user. For example, a user may initially call into the system and then be disconnected. Based on the state of the dialog with the user, a system may then initiate additional communication to the user with an email (or instant message). By continuing contextually relevant communication, the system performs the task inquired about by the user.

FIG. 1A, FIG. 1B, FIG. 1C, and FIG. 1D show diagrams of embodiments that are in accordance with the disclosure. The embodiments of FIG. 1A, FIG. 1B, FIG. 1C, and FIG. 1D may be combined and may include or be included within the features and embodiments described in the other figures of the application. The features and elements of FIG. 1A, FIG. 1B, FIG. 1C, and FIG. 1D are, individually and as a combination, improvements to the technology of dialog bot managers. The various elements, systems, and components shown in FIG. 1A, FIG. 1B, FIG. 1C, and FIG. 1D may be omitted, repeated, combined, and/or altered as shown from FIG. 1A, FIG. 1B, FIG. 1C, and FIG. 1D. Accordingly, the scope of the present disclosure should not be considered limited to the specific arrangements shown in FIG. 1A, FIG. 1B, FIG. 1C, and FIG. 1D.

Turning to FIG. 1A, an example shows the server application (103) that includes multiple programs that process multiple types of data. It is not necessary that the application be run as a server application. For example, the application may run in a browser, on a mobile client application, or a combination thereof.

The programs within the server application (103) include the input formatting engine (122), the text to word vector engine (124), the word vector to phrase vector engine (126), the token identification engine (128), the unsupervised scoring engine (132), the supervised scoring engine (136), the voting engine (140), and the path update engine (144). The data processed by the server application (103) includes the user input (121), the text string (123), the set of word vectors (125), the phrase vector (127), the set of identified tokens (129), the unsupervised token (133), the supervised token (137), the voted token (141), the set of saliency weights (145), the set of recent tokens (149), the explicit path state (153), and the recent path list (155).

Figure 1B:
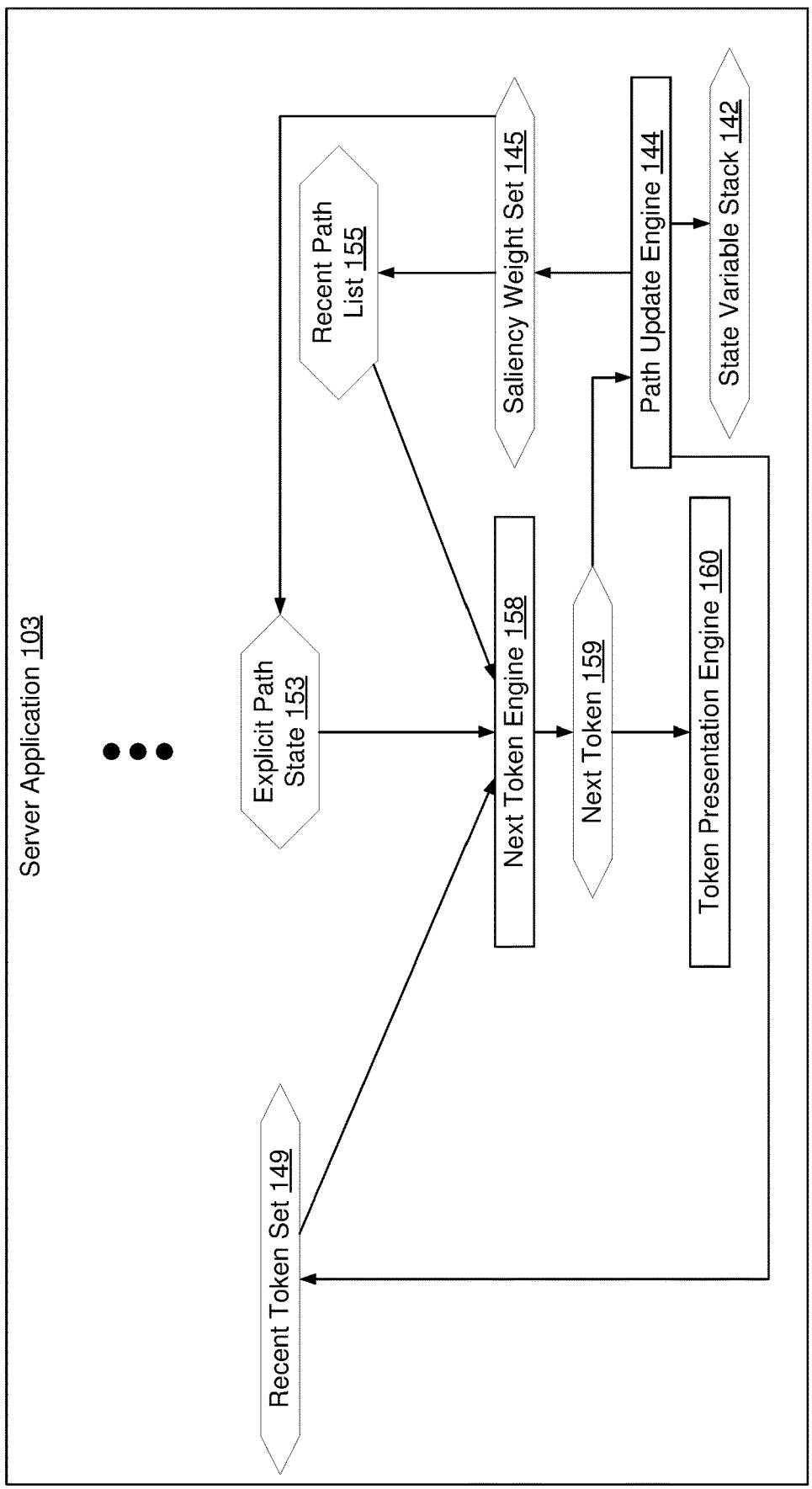
Figure 1C:
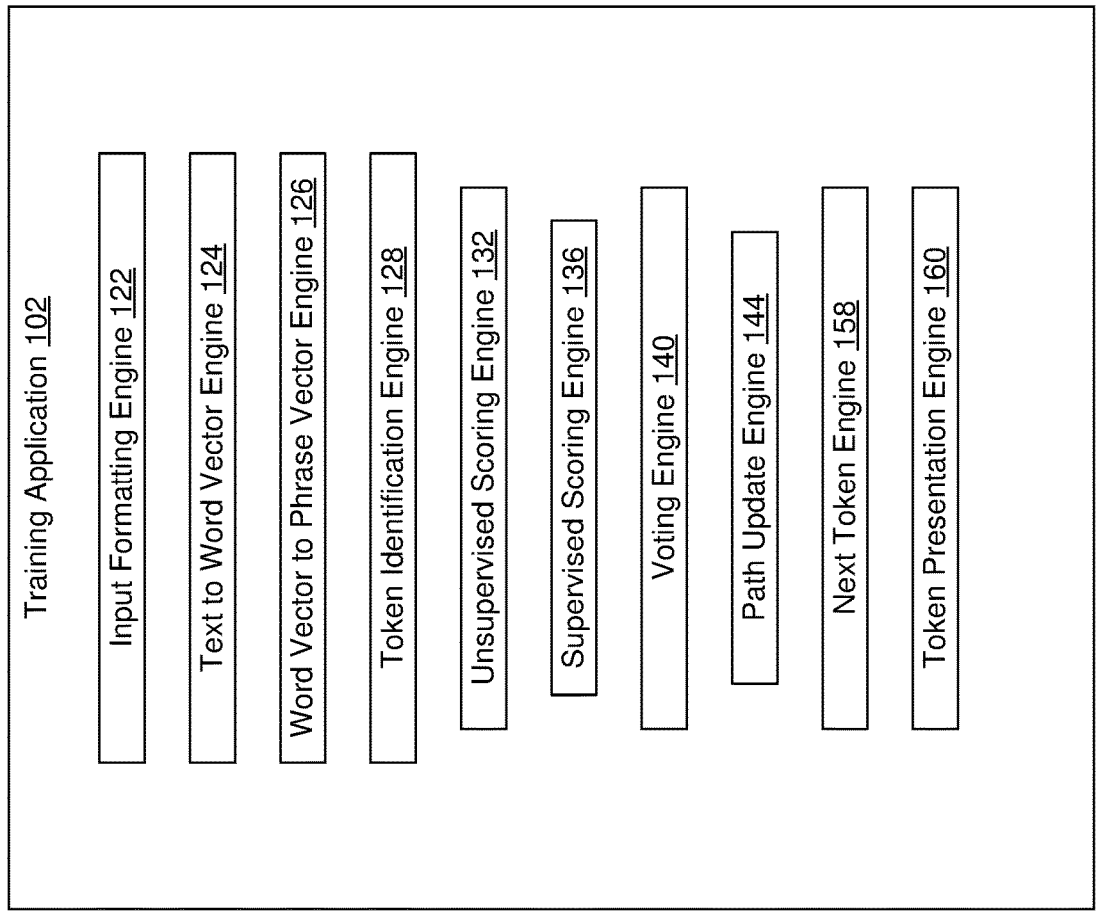
Figure 1D:
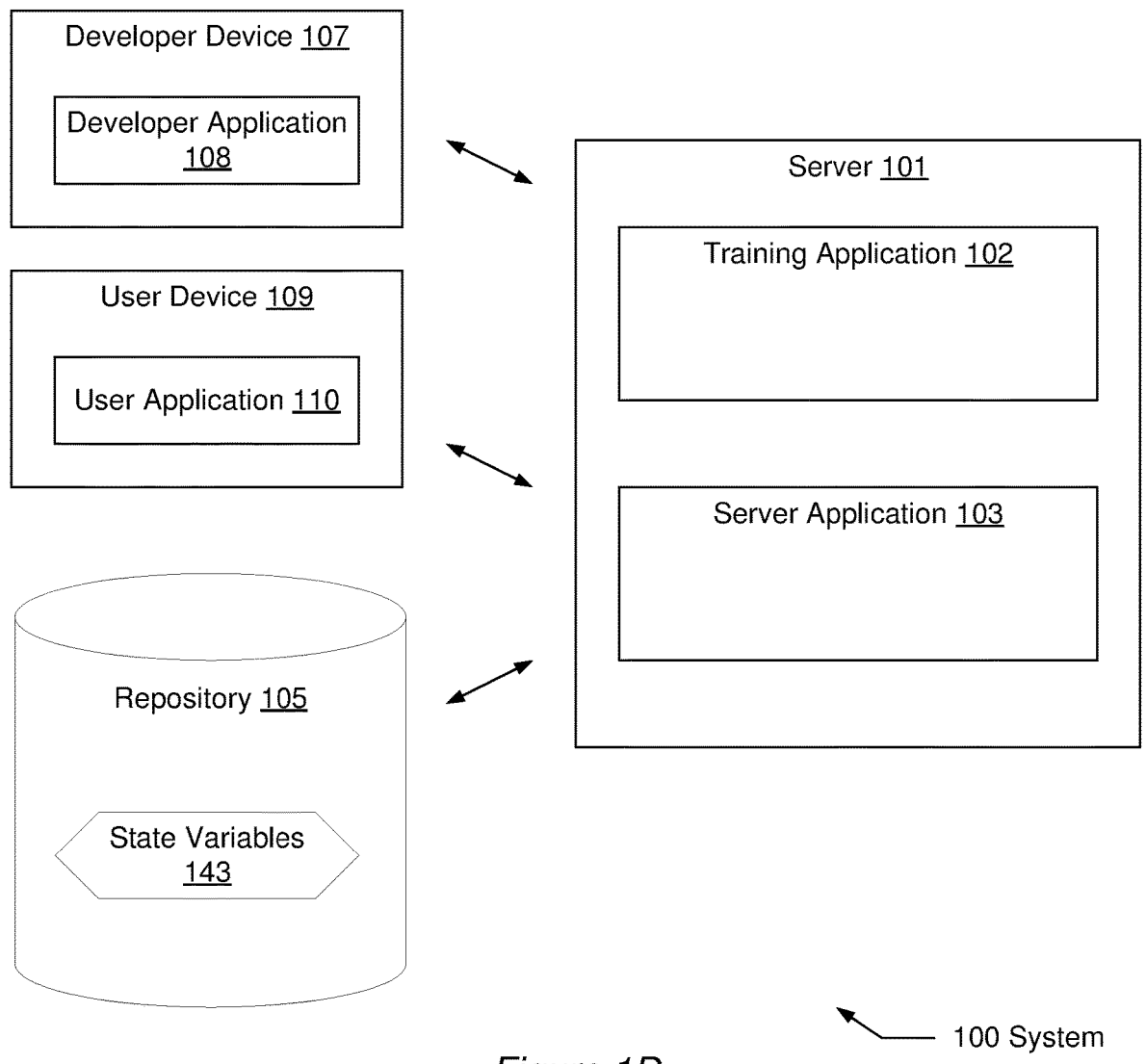

The user input (121) may be received by the server application (103) from the client device (109) (shown in FIG. 1D). The user input (121) may be text from a text application (e.g., a chat client or short message service (SMS) application) or speech from a voice application (e.g., a call using voice over internet protocol (VOIP), session initiation protocol (SIP), plain old telephone service (POTS), etc.).

The input formatting engine (122) receives the user input (121) and outputs the text string (123). When the user input (121) is not in text form (e.g., speech from a voice application), the input formatting engine (122) may use a machine learning model to convert the speech to text, which may be referred to as converted text. The text form of the user input (121) may be processed by the input formatting engine (122) to remove capitalization, remove punctuation, remove extraneous code, etc.

The text string (123) may be a sequence of characters encoded according to a standardized format, examples of which include (Unicode transformation format) UTF-8, UTF-16, UTF-32, American Standard Code for Information Interchange (ASCII), etc. The text string (123) is generated by the input formatting engine (122) and is input to the text to word vector engine (124).

The text to word vector engine (124) is a program within the server application (103). The text to word vector engine (124) converts the text string (123) to the set of word vectors (125). The text to word vector engine (124) may convert each word in the text string (123) into a word integer, which may then be converted to a one hot word vector. The word integer is an integer that is mapped to a word and the system (100) maintains a mapping of words to integers, which may be stored in the repository (105). The one hot word vector may be generated from the word integer. The one hot word vector is a vector having one element set to 1 and the remaining elements set to zero with each element corresponding to a word used by the system (100). Each one hot vector generated from the text string (123) may then be converted to an embedded word vector, also referred to as a word vector. The embedded word vector may be generated using a machine learning algorithm (e.g., word2vec, global vectors (GloVe), etc.). An embedded word vector is a vector of elements of rational numbers where each word of the system may have a unique embedded word vector and similar words may have elements with similar values. The elements of an embedded word vector may be referred to as latent features. The machine learning model used to generate the embedded word vectors may be pretrained (e.g., the GPT-2 model) or may be specifically trained on the words used by the system (100). Each of the words from the text string (123) are converted by the text to word vector engine (124) to a word vector to form the set of word vectors (125).

The word vector set (125) is a set of word vectors generated from the words of the text string (123). The word vector set (125) is generated by the text to word vector engine (124) and input to the word vector to phrase vector engine (126).

The word vector to phrase vector engine (126) is a program within the server application (103). The word vector to phrase vector engine (126) converts the word vector set (125) to the phrase vector (127). In one or more embodiments, the word vector to phrase vector engine (126) may average the word vectors in the word vector set (125) to generate the phrase vector (127). In one or more embodiments, the word vector to phrase vector engine (126) may use a machine learning model (e.g., a neural network) to generate the phrase vector (127) from the word vector set (125).

The phrase vector (127) is a vector of elements of rational numbers. The phrase vector (127) may have the same number of elements as the word vectors from the word vector set (125). The phrase vector (127) represents the user input (121) and is input to the token identification engine (128).

The token identification engine (128) is a program within the server application (103). The token identification engine (128) identifies tokens related to the phrase vector (127).

A token identifies phrase vectors that are similar. For example, the phrases "How long will this take?" and "Is this going to take a while?" are different phrases that may have different phrase vectors and be associated with the same token. A token may be calculated as the centroid of a set of phrase vectors that have similar meaning.

Additionally, the tokens of the system (100) may be labeled with additional tags that identify a path state that corresponds to a token. A path state of the system (100) may identify the state of the path that corresponds to the user interaction with the system (100). For example, a first path (e.g., "[PATH_A]") may be for home equity line of credit (HELOC) and a second path (e.g., "[PATH_B]") may be for auto insurance. The path state may indicate the path and may include values for other information gathered during the user interaction. For example, as the user interacts with the system (100), the user may identify whether the user owns a home and the amount of equity. Whether or not this information has been provided and the information itself may be stored as part of the path state. For example, a path state may include "[PATH: heloc, home_owner: true, equity: null]", which identifies that the user is inquiring about a HELOC, is a homeowner, and the amount of equity has not been identified or is some unknown state.

The token identification engine (128) may identify a set of tokens, referred to as the identified token set (129), that are nearest to the phrase vector (127). The token identification engine (128) may rank each token in reverse order by the euclidean distance between the token and the phrase vector (127). The token identification engine (128) may identify the identified token set (129) from the ranked tokens with an identification threshold. The identification threshold may be a number of tokens (e.g., the 10 closest tokens), a percentage of tokens (e.g., the 10% of tokens with the least euclidean distance), a distance (e.g., 10 units), etc.

The identified token set (129) is a set of tokens identified from the universe of tokens maintained by the system (100) that are nearest to the phrase vector (127). A token may be a label that corresponds to a centroid of phrase vectors that have a similar meaning.

The recent token set (149) is a set of tokens that identify the most recent tokens used in the dialog with the user. The recent token set (149) may be a queue with a predetermined length (e.g., 15 tokens). The tokens in the recent token set (149) may alternate between tokens related to inputs received from the user and tokens related to outputs provided by the system (100) to the user. Tokens from the same source (i.e., the user or the system 100) may be adjacent to each other in the recent token set (149). For example, a user may ask a first question and then a second question before the system (100) provides a response.

The unsupervised scoring engine (132) is a program within the server application (103). The unsupervised scoring engine (132) selects the unsupervised token (133) from the identified token set (129) using the recent token set (149). The unsupervised scoring engine (132) may use a machine learning model that takes tokens from the identified token set (129) and the recent token set (149) as inputs and generates unsupervised scores for the tokens of the identified token set (129). The token with the optimal unsupervised score (e.g., the highest or lowest unsupervised score, depending on the algorithm used) is identified as the unsupervised token (133).

The explicit path state (153) is a state variable that identifies the current path at the level of a conversation. The explicit path state (153) identifies a path for the tokens of a dialog between the user and the system (100). For example, a first path (e.g., "[PATH_A]") may be for home equity line of credit (HELOC) and a second path (e.g., "[PATH_B]") may be for auto insurance. The explicit path state (153) may maintain a superposition of multiple path probabilities to identify the current path. For example, the explicit path state (153) may be "[HELOC: 0.8, AUTO: 0.1]", which identifies that there is an 80% probability that the path for a token is related to starting a HELOC and a 10% probability that the path for a token is related to setting up auto insurance.

The saliency weight set (145) is a set of state variables that identify the current attention of the conversation. The attention of the conversation identifies a particular task to be done as part of the overall interaction with the user. For example, checking a rate or answering a user question may be different tasks identified by the saliency weight set (145) that are part of applying for a line of credit.

The recent path list (155) is a list of path states for the tokens in the dialog between the user and the system (100). The path states in the recent path list (155) may correspond to the tokens in the recent token set (149).

The supervised scoring engine (136) is a program within the server application (103). The supervised scoring engine (136) selects the supervised token (137) from the identified token set (129) using the explicit path state (153) and the recent path list (155). The supervised scoring engine (136) may use a machine learning model that takes tokens from the identified token set (129) and path states from the explicit path state (153) and the recent path list (155) as inputs and generates supervised scores for the tokens of the identified token set (129). The token with the optimal supervised score (e.g., the highest or lowest supervised score, depending on the algorithm used) is identified as the supervised token (137).

The voting engine (140) is a program within the server application (103). The voting engine (140) identifies the voted token (140) from the unsupervised token (133) and the supervised token (137) using the unsupervised score for the unsupervised token (133), the supervised score of the supervised token (137), and the saliency weight set (145). The voting engine (140) may use a machine learning model that takes tokens from the unsupervised token (133) and the supervised token (137), scores from the unsupervised scoring engine (132) and the supervised scoring engine (136), and weights from the saliency weight set (145) as inputs and generates voting outputs that identify one of the unsupervised token (133) and the supervised token (137) as the voted token (141). The voting engine (140) may output scalar values that correspond to the unsupervised token (133) and the supervised token (137). The token with the optimal voting output (e.g., the highest or lowest voting output, depending on the algorithm used) is identified as the voted token (141). As an example, the voting engine (140) may take the highest saliency weight from the saliency weight set (145); multiply the unsupervised score for the unsupervised token (133) by (1−(the highest saliency weight)), multiply the supervised score for the supervised token (137) by the highest saliency weight; and then identify the token having the highest adjusted score as the voted token.

The path update engine (144) is a program within the server application (103). The path update engine (144) controls the state variable stack (142) and updates the state variables (143) (shown in FIG. 1D), which may include the recent token set (149), the saliency weight set (145), the explicit path state (153), and the recent path list (155) and are based on the voted token (141).

The path update engine (144) may update the recent token set (149) by queuing the voted token (141) to the front of the of the recent token set (149) and dequeuing the last token from the recent token set (149). The path update engine (144) may update the saliency weight set (145) using a machine learning algorithm (e.g., a neural network) that takes the voted token (141), the recent token set (149) (before being updated with the voted token), and the recent path list (155) as inputs and output an updated saliency weight set. The updated saliency weight set may then replace the saliency weight set (145), be added to the recent path list (155), and be set as the explicit path state (153).

The path update engine (144) updates the state variable stack (142) based on changes to the state variables (143). Changes to the explicit path state (153) may indicate that the user is attempting to accomplish a different goal or perform a different task for a goal. The path update engine (144) pushes the state variables (143) to the state variable stack (142) so that a first conversation (identified with a first set of state variables) may be resumed after a second conversation (identified with a second set of state variables) that interrupted the first conversation concludes.

For example, changing from inquiring about a home equity line of credit to inquiring about automobile insurance triggers a change to the explicit path state (153). Before changing the explicit path state (153), the path update engine (144) stores the state variables (143) by pushing them to the state variable stack (142). After the conversation and dialogue about automobile insurance ends, the state variable stack (142) is popped to recover the state variables (143) related to inquiring about a home equity line of credit to continue that conversation and dialogue.

Turning to FIG. 1B, the server application (103) further includes the next token engine (158) and the token presentation engine (160). The data processed by the server application (103) further includes the next token (159).

The next token engine (158) is a program within the server application (103). The next token engine (158) determines the next token (159) using the recent token set (149), the explicit path state (153), and the recent path list (155). The next token engine (158) may determine the next token (159) using a machine learning algorithm (e.g., a neural network) that takes tokens from the recent token set (149) (after being updated with the voted token) and saliency weights from the recent path list (155) (which may include the explicit path state 153, after being updated based on the voted token) as inputs and output the next token (159). The next token (159) is a token identified by the system (100) as the response to the user input (121) (shown in FIG. 1A). The path update engine (144) may then update the recent token set (149), the saliency weight set (145), the explicit path state (153), the recent path list (155), the state variable stack (142), and the state variables (143) based on the voted token (141).

The token presentation engine (160) is a program within the server application (103). The token presentation engine (160) generates an output of the system (100) that is presented to the user. The token presentation engine (160) may present an output that is a text string (for online or SMS chats), speech (for a voice conversation), email, etc.

For example, the token presentation engine (160) may receive the next token (159), convert the next token (159) to a next phrase vector, convert the next phrase vector to a next word vector set, convert the next word vector set to a text string, and present the text string to the user. Further, the token presentation engine (160) may further convert the text string to speech that is played to the user.

As another example, if a dialog has been interrupted (e.g., a call between the system (100) and the user is disconnected), then the token presentation engine (160) may construct an email to continue the dialog via email. The token presentation engine (160) may use multiple machine learning models (e.g., neural networks) for each part of the email. The subject may be generated with a transformer neural network that takes as input recent path list (155) and the recent token set (149) and output a text string that is the subject for the email. A different model may be used for generating the text in the body of the email that uses similar inputs.

Turning to FIG. 1C, the training application (102) is a program that may execute on the server (101) (shown in FIG. 1D). The training application (102) trains the machine learning models used by the system (100). The input formatting engine (122), the text to word vector engine (124), the word vector to phrase vector engine (126), the token identification engine (128), the unsupervised scoring engine (132), the supervised scoring engine (136), the voting engine (140), the path update engine (144), the next token engine (158), and the token presentation engine (160) may each include multiple machine learning models trained by the training application (102). The training application (102) may retrieve training data from the repository (105) (shown in FIG. 1D) for the machine learning models used by the system, generate outputs from the machine learning models based on the training data, and update the machine learning models based on errors between the output generated from the machine learning models and the expected outputs for the training data.

The training application may train the machine learning models, including the word vector to phrase vector engine, with multiple sets of word vectors, multiple hashtags, and with multiple tokens. Training with word vectors, hashtags, and tokens to generate a phrase vector space of latent features based on the plurality of sets of word vectors, the plurality of hashtags, and the plurality of tokens.

When training the machine learning models used by the system (100), the inputs to the models may be supplemented with hashtags. The hashtags are labels that may provide additional context and identify the meaning of the user input, sets of word vectors, phrase vectors, and tokens. For example, the hashtag "[#heloc]" may identify that the user input is related to an inquiry about a home equity line of credit (HELOC) from the financial services provider. Hashtags may be inserted into training data by supplementing historical user inputs and text strings with the text of the hashtags. Hashtags may also be inserted into training data by supplementing historical word vector sets with word vectors of the hashtags. Training in this manner, i.e., by injecting the hashtags into the historical training data, includes information about the hashtags in the latent features of the phrase vectors used by the system. Additionally, the hashtags may be labels that are associated with particular tokens to identify additional context related to the token and train the machine learning models of the system.

Turning to FIG. 1D, the system (100) includes the server (101), the repository (105), the developer device (107), and the user device (109). The server (101) may include the training application (102) and the server application (103).

The training application (102) is a program on the server (101). The training application (102) trains the machine learning models of the system (101), as further described in FIG. 1C. The training application (102) may be operated or controlled by the developer device (107) with the developer application (108).

The server application (103) is a program on the server (101). The server application (103) includes multiple programs and machine learning models used by the system (101) to interact with the user device (109), as further described in FIG. 1A and FIG. 1B.

Figure 4A:
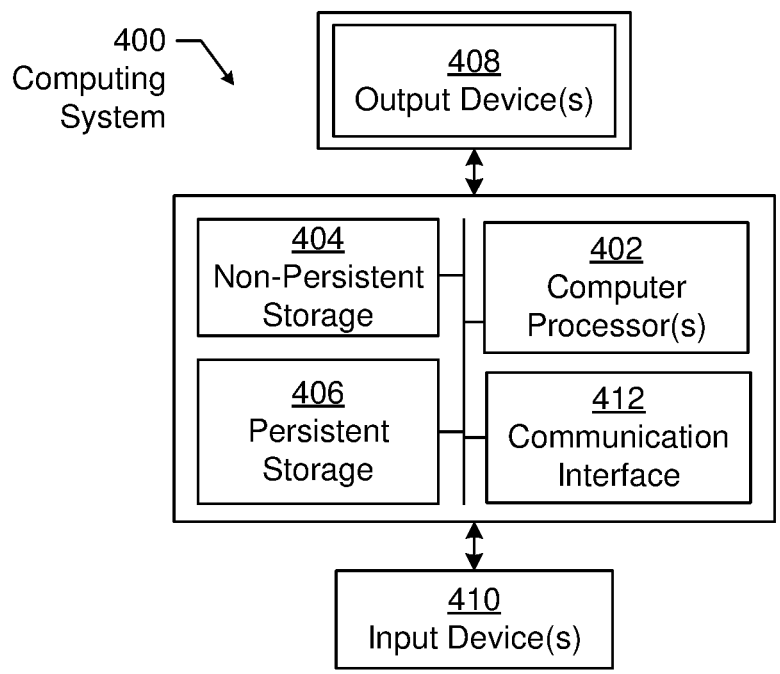
FIG. 4A and FIG. 4B show a computing system in accordance with one or more embodiments of the invention.
Figure 4B:
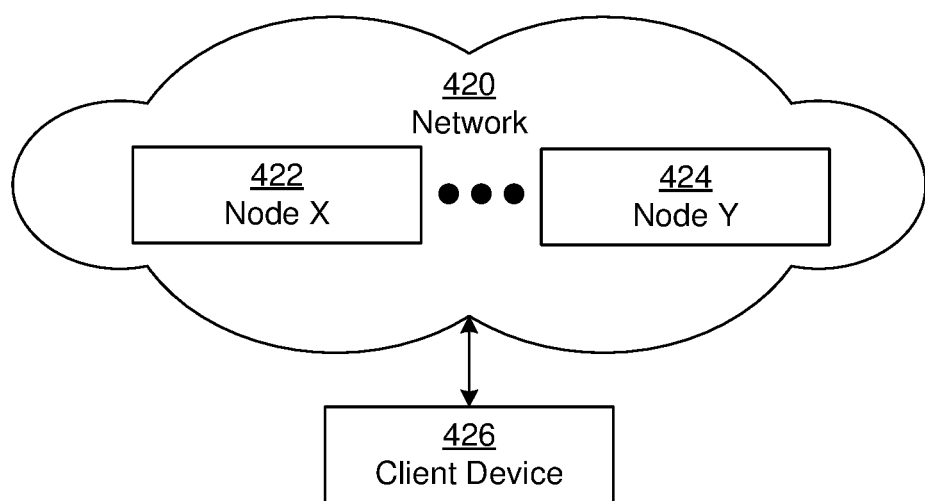

The server (101) is an embodiment of the computing system (400) and the nodes (422) and (424) of FIG. 4A and FIG. 4B. The server (101) may be one of a set of virtual machines hosted by a cloud services provider to deploy the training application (102) and the server application (103) for a financial services provider.

The repository (105) is a computing system that may include multiple computing devices in accordance with the computing system (400) and the nodes (422) and (424) described below in FIGS. 4A and 4B. The repository (105)

may be hosted by a cloud services provider for the financial services provider. The cloud services provider may provide hosting, virtualization, and data storage services as well as other cloud services and the financial services provider may operate and control the data, programs, and applications that store and retrieve data from the repository. The data in the repository (105) may include (shown in FIG. 1A) the user input (121), the text string (123), the word vector set (125), the phrase vector (127), the identified token set (129), the recent token set (149), the explicit path state (153), the recent path list (155), the unsupervised token (133), the supervised token (137), the saliency weight set (145), the voted token (141), and the next token (159). The data in the repository (105) may further include the next token (159) (shown in FIG. 1B) and the state variables (143). The data in the repository (105) may also include the training data used to train the machine learning models used by the system (100).

The state variables (143) include multiple types of state variables tracked by the system (100). The state variables (143) include entity state variables, dialog saliency state variables, and attention saliency state variables.

The entity state variables track information about the user (e.g., name, address, contact information, etc.). As an example, in the following interaction, the name "Bob" is an entity state variable identified by the system.

What is your name?
My name is <Bob>

The dialog saliency state variables (including the explicit path state (153)) track information about the dialogue with the user at the conversation level to identify the point of the conversation (e.g., the type of product the user is inquiring about, such as a HELOC or auto insurance). The following interaction shows conversation level saliency with dialog about home equity lines of credit (HELOCs).

Can I borrow money against my home?
Yes.

From the above example, a state variable may be set for the type of target loan: "Loan_Target_Type={subject: Heloc, confidence: 0.7}".

The attention saliency state variables (including the saliency weight set (145)) track information about the current task or state of the interaction with a user. The following interaction shows attention level saliency with dialog about particular steps related to acquiring home equity lines of credit (HELOCs).

Would you like us to check your rate?
Will it affect my fico?

From the above example, a state variable may be set to identify the current subject, e.g., "current_subject={subject: fico, confidence: 0.8}".

The developer device (107) is an embodiment of the computing system (400) and the nodes (422) and (424) of FIG. 4A and FIG. 4B. The developer device (107) includes the developer application (108) for accessing the training application (102). The developer application (108) may include a graphical user interface for interacting with the training application (102) to control training of the machine learning models of the system (100).

The user device (109) is an embodiment of the computing system (400) and the nodes (422) and (424) of FIG. 4A and FIG. 4B. The user device (109) includes the user application (110) for accessing the server application (103). The user application (110) may include multiple interfaces (e.g., a graphical user interface, a voice interface, etc.) for interacting with the server application (103). A user may operate the user application (110) to perform tasks with the server application (103), including tasks that identify the products and services from the financial services provider for which the user qualifies. The results may be presented by being displayed by the user device (109) in the user application (110) or through an audio output of the user device (109). The user of the user device (109) may be a customer of the financial services provider.

The developer application (108) and the user application (110) may be web browsers that access the training application (102) and the server application (103) using web pages hosted by the server (101). The developer application (108) and the user application (110) may additionally be web services that communicate with the training application (102) and the server application (103) using representational state transfer application programming interfaces (RESTful APIs). Although FIG. 1D shows a client server architecture, one or more parts of the training application (102) and the server application (103) may be local applications on the developer device (107) and the user device (109) without departing from the claimed scope.

Figure 2:
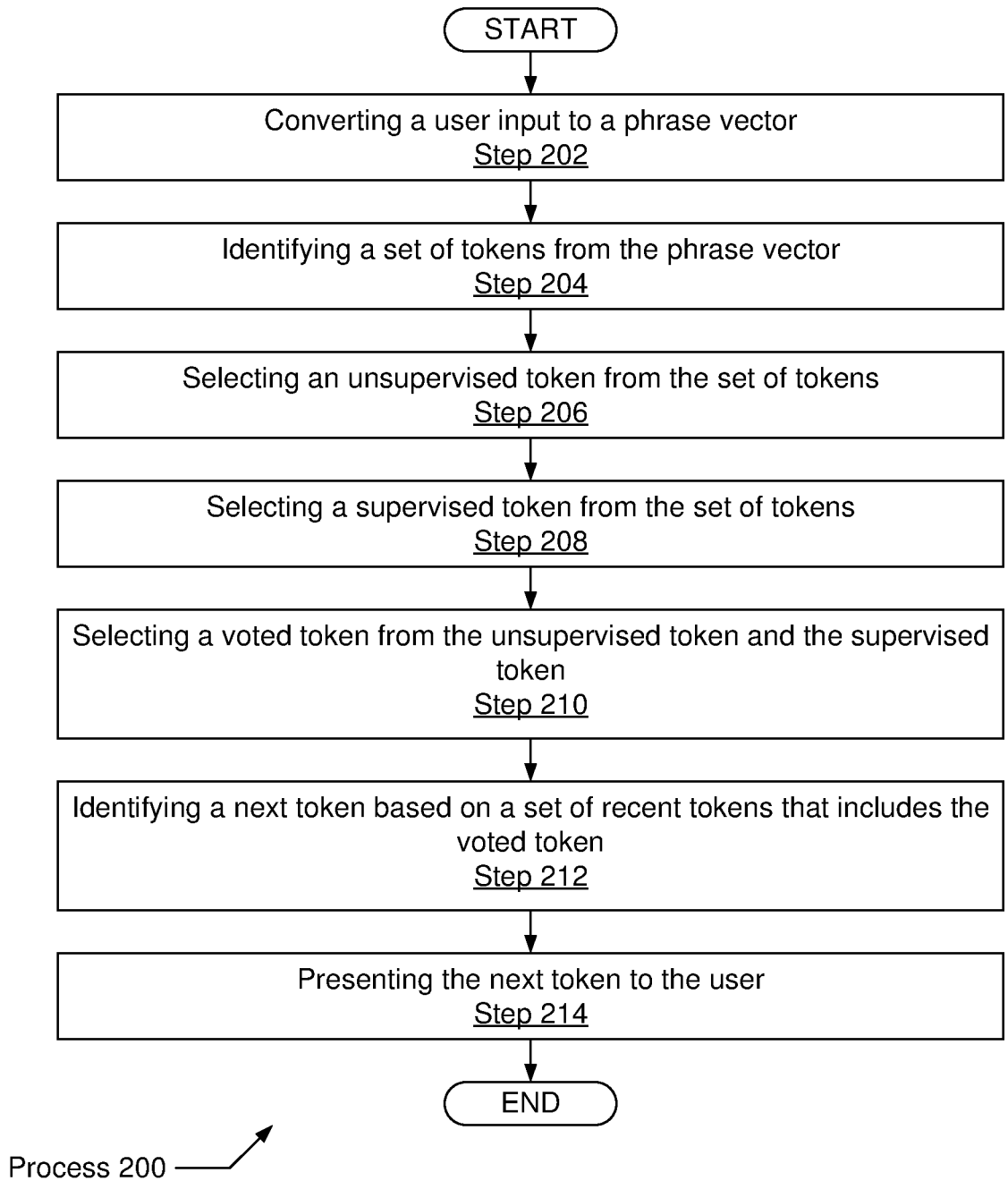
FIG. 2 shows a flowchart in accordance with disclosed embodiments.

FIG. 2 shows a flowchart of the process (200) in accordance with the disclosure. The embodiments of FIG. 2 may be combined and may include or be included within the features and embodiments described in the other figures of the application. The features of FIG. 2 are, individually and as an ordered combination, improvements to the technology of computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) interacts with a user by identifying a token from a user input, selecting a next token to present to the user, and presenting the token to the user. In Step 202, user input is converted to a phrase vector.

The user input may be converted to the phrase vector using multiple programs, e.g., an input formatting engine, a text to word vector engine, and a word vector to phrase vector engine. The input formatting engine may generate a text string from the user input. When the user input is voice, the input formatting engine may convert the speech from the user to a text string. The input formatting engine may clean up the text from the user to remove capitalization, remove punctuation, remove extraneous code, etc.

The text to word vector engine may convert the text from the input formatting engine to a set of word vectors. The text to word vector engine may split the text into a list of words, convert the list of words to a set of embedded word vectors using a lookup table. The embedded word vectors may be from a pretrained model for general usage or may be specially trained on words used by the financial services provider to interact with users.

The word vector to phrase vector engine converts the set of word vectors to a phrase vector. The word vector to phrase vector engine generates the phrase vector as the centroid of the word vectors from the set of word vectors. Additionally, a machine learning model may be used to generate the phrase vector from the set of word vectors.

In Step 204, a set of tokens is identified from the phrase vector. The set of tokens may be referred to as an identified token set and be identified with a token identification engine after the phrase vector is generated from the user input. When the tokens are centroids of similar phrase vectors, then the tokens and phrase vectors are in the same vector space and the identified token set may be identified as the tokens with centroid values having the shortest euclidean distance to the phrase vector.

In Step 206, an unsupervised token is selected from the set of tokens. The unsupervised token may be selected by scoring the tokens of the identified token set with an unsupervised scoring engine. In addition to the identified token set, the unsupervised scoring engine may take as input a recent token set that includes a number of the most recent tokens that correspond to the dialog with the user. For example, the unsupervised scoring engine may calculate the centroid of the recent tokens from the recent token set and find the distance between the centroid of recent tokens and each of the tokens from the identified token set to score the tokens of the identified token set in an unsupervised manner.

Additionally, the unsupervised scoring engine may generate a predicted token that is a prediction of what the token for the user input should be based on tokens of the recent token set. For example, the unsupervised scoring engine may include a neural network, which may include a long short term memory (LSTM), that takes the recent tokens as inputs and outputs the predicted token. The unsupervised scoring engine may then determine the unsupervised scores as the distance between the predicted token and the tokens of the identified token set.

In Step 208, a supervised token is selected from the set of tokens. The supervised token may be selected by scoring the tokens of the identified token set with a supervised scoring engine.

In addition to the identified token set, the supervised scoring engine may take as input the explicit path state and the recent path list. Each of the tokens of the system may be labeled with path state information. The supervised scoring engine may adjust the score of identified tokens that are labeled with path states that match the explicit path state or the path states from the recent path list.

In Step 210, a voted token is selected from the unsupervised token and the supervised token. The voted token may be selected with a voting engine that takes the identified token with the optimal unsupervised score (referred to as the unsupervised token), the token with the optimal supervised score (referred to as the supervised token) as input, and the set of saliency weights (referred to as the saliency weight set) as inputs. The voting engine may weight the unsupervised token and supervised token based on the saliency weight set and select the token with the highest weight as the voted token.

In Step 212, a next token is identified based on a set of recent tokens that includes the voted token. The next token may be identified with the next token engine that takes as inputs the recent tokens and recent path states of the dialog with the user. The next token engine may use a neural network with an LSTM to identify the next token from the inputs.

In Step 214, the next token is presented to the user. The next token may be present by a token presentation engine. The token presentation engine may determine the current status of the dialog with the user and construct a response accordingly. For example, if the user has called into the system and is still connected, the token presentation engine may select a phrase vector that corresponds to the next token, generate a text string from the phrase vector, convert the text string to speech, and deliver the speech to the user. If the user is not connected on a call, the token presentation engine may determine whether to present the next token with an instant message or an email. If the user previously communicated using an instant message, the token presentation engine may communicate the next token using an instant message. If the user is not on a call and has not used instant messaging with the system, the token presentation engine may construct an email message to continue the dialog with the user.

Figure 3B:
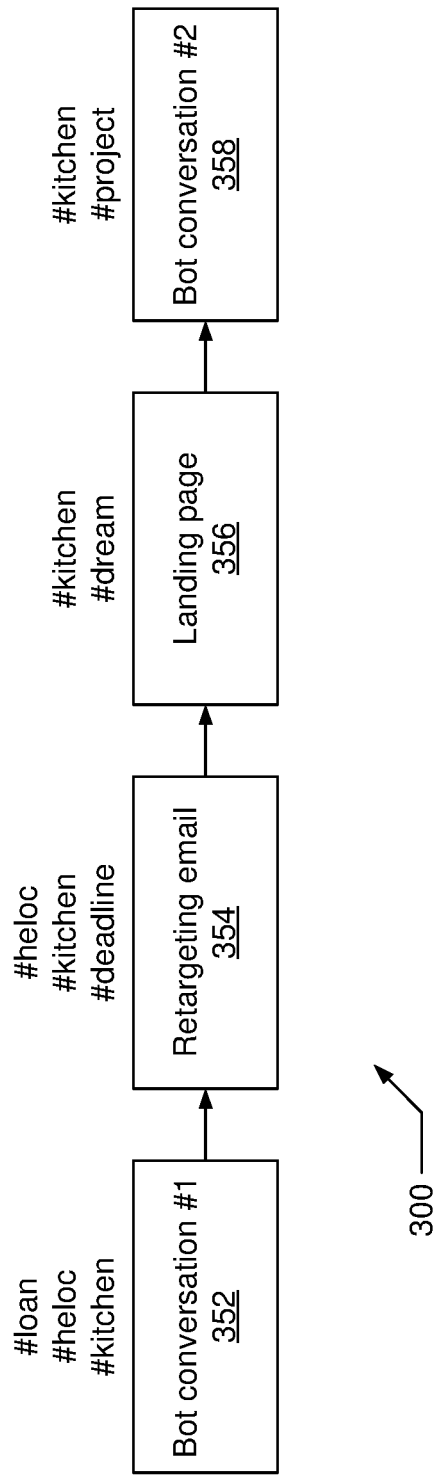

FIG. 3A and FIG. 3B show examples of systems and interfaces in accordance with the disclosure. The embodiments of FIG. 3A and FIG. 3B may be combined and may include or be included within the features and embodiments described in the other figures of the application. The features and elements of FIG. 3A and FIG. 3B are, individually and as a combination, improvements to the technology of natural language computing systems. The various features, elements, widgets, components, and interfaces shown in FIG. 3A and FIG. 3B may be omitted, repeated, combined, and/or altered as shown. Accordingly, the scope of the present disclosure should not be considered limited to the specific arrangements shown in FIG. 3A and FIG. 3B.

Turning to FIG. 3A, the window (300) is a program that may be displayed on a developer device that shows a dialog between a user and a server application. The hashtags in the window (320) may be hidden from the display. The window (320) shows the most recent inputs (from the "user") and outputs (from the "bot" server application to the user). The window (321) shows the next output to the user. Each of the lines (301) through (313) include an identifier of the source ("user" or "bot"), a text string (e.g., "hi" for the line (301)) and a set of hashtags (e.g., "#heloc #loan #greeting" for the line (301)). During a live conversation, the hashtags may be identified in realtime after converting the user input to a phrase vector and token.

The hashtags may include dialog level hashtags (e.g., "#heloc" and "#loan"). Dialog level hashtags identify the context of the conversation with the user. The hashtags may include phrase level hashtags (e.g., "#greeting" for the line (301)). Phrase level hashtags identify the context of individual user inputs that correspond to phrase vectors.

The window (330) displays the path state for the server application. The lines (331) through (335) show the path state for the line (312) from the window (320). The path state and the most recent tokens (which correspond to the lines (301) through (312) in the window 320) are used by the next token engine to identify the next token that corresponds to the line (313) in the window (321).

Turning to FIG. 3B, the sequence (300) includes several interactions with a user. The user may initiate the first bot conversation (352) by calling a financial services provider. The bot conversation (352) includes the conversation illustrated in FIG. 3A. The bot conversation (352) is associated with the hashtags "#loan", "#heloc", and "#kitchen", which indicate that the user is interested in a loan, qualifies for a HELOC, and is looking to use the proceeds for kitchen improvements (e.g., repairs, upgrades, remodeling, etc.).

After the bot conversation (352), the system may generate and send the retargeting email (354) to the user. The retargeting email may be generated by a token presentation engine that uses machine learning models to generate the components of the email. The components of the email are generated by the token presentation engine based on the sequence of tokens, the hashtags, and the path states from the bot conversation (352). The retargeting email (354) is associated with the hashtags "#heloc", "#kitchen", and "#deadline". The hashtag labels may be associated with the email subject line and may be associated with email content. Elements within the email content (e.g., paragraphs/images) may also be tagged with hashtags (e.g., #family for an image, etc.). The hashtags for the retargeting email (354) indicate that the retargeting email (354) is related to a HELOC inquiry for kitchen improvements and includes a deadline. The deadline may be the date when the HELOC needs to be secured by or the date by which the user indicated when the kitchen improvements needed to be complete. The retargeting email (354) may further include a link to the landing page (356).

The landing page (356) is generated by the system in conjunction with the retargeting email. The landing page (356) may be generated dynamically in response to the user opening the link for the landing page (356) from the retargeting email (354). The landing page (356) is associated with the hashtags "#kitchen" and "#dream", which indicate that the landing page (356) includes content (text, images, video, etc.) related to a dream kitchen. Each of the individual elements (text, images, video, etc.) of the landing page may be associated with multiple hashtags. The landing page (356) may further include a phone number, chat box, or voice chat window to initiate the second bot conversation (358).

The bot conversation (358) may be initiated by the user after the first bot conversation (352). For example, the bot conversation (358) may be triggered by selecting a link included in the retargeting email (354) or the landing page (356). The bot conversation (358) is associated with the hashtags "#kitchen" and "#project", which indicate that the bot conversation (358) is related to a project to remodel the user's kitchen. The responses from the system to the user during the bot conversation (358) may be selected and identified using the machine learning models used during the first bot conversation (352).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   converting a user input to a phrase vector;
   identifying, by a token identification engine, a set of identified tokens from the phrase vector;
   processing the set of identified tokens with an unsupervised scoring engine to select an unsupervised token from the set of identified tokens;
   processing the set of identified tokens with a supervised scoring engine to select a supervised token from the set of identified tokens;
   selecting a voted token from the unsupervised token selected with the unsupervised scoring engine and the supervised token selected with the supervised scoring engine, wherein the voted token is selected with a machine learning model trained to identify the voted token from the unsupervised token and the supervised token;
   identifying a next token based on a set of recent tokens that includes the voted token, wherein identifying the next token comprises:
      setting an explicit path state based on the voted token, and
      identifying, by a next token engine, the next token using the set of recent tokens, the explicit path state, and a recent path list; and
   presenting the next token as one of a voice communication and an email communication.

2. The method of claim 1, further comprising:
converting, by an input formatting engine, the user input to a text string;
converting, by a text to word vector engine, the text string to a set of word vectors; and
converting, by a word vector to phrase vector engine, the set of word vectors to the phrase vector.

3. The method of claim 2, further comprising:
training the word vector to phrase vector engine with a plurality of sets of word vectors, a plurality of hashtags, and a plurality of tokens to generate a phrase vector space of latent features based on the plurality of sets of word vectors, the plurality of hashtags, and the plurality of tokens.

4. The method of claim 1, further comprising:
scoring, with the unsupervised scoring engine, each identified token of the set of identified tokens using the set of recent tokens prior to the voted token being included in the set of recent tokens,
wherein the unsupervised token has a highest unsupervised score from the set of identified tokens.

5. The method of claim 1, further comprising:
scoring, with the supervised scoring engine, each identified token of the set of identified tokens using the explicit path state that identifies a current path state and the recent path list,
wherein the supervised token has a highest supervised score from the set of identified tokens.

6. The method of claim 1, further comprising:
scoring, with a voting engine, the unsupervised token and the supervised token using a set of saliency weights,
wherein the voted token has a highest voted score from the set of identified tokens.

7. The method of claim 1, further comprising:
updating the set of recent tokens to include the voted token; and
updating the recent path list based on the voted token.

8. A system comprising:
a processor; and
a memory coupled to the processor,
the memory comprising an application, wherein the application executes on the processor and is configured for:
converting a user input to a phrase vector;
identifying, by a token identification engine, a set of identified tokens from the phrase vector;
processing the set of identified tokens with an unsupervised scoring engine to select an unsupervised token from the set of identified tokens;
processing the set of identified tokens with a supervised scoring engine to select a supervised token from the set of identified tokens;
selecting a voted token from the unsupervised token selected with the unsupervised scoring engine and the supervised token selected with the supervised scoring engine, wherein the voted token is selected with a machine learning model trained to identify the voted token from the unsupervised token and the supervised token;
identifying a next token based on a set of recent tokens that includes the voted token, wherein identifying the next token comprises:
setting an explicit path state based on the voted token, and
identifying, by a next token engine, the next token using the set of recent tokens, the explicit path state, and a recent path list; and
presenting the next token as one of a voice communication and an email communication.

9. The system of claim 8, wherein the application is further configured for:
converting, by an input formatting engine, the user input to a text string;
converting, by a text to word vector engine, the text string to a set of word vectors; and
converting, by a word vector to phrase vector engine, the set of word vectors to the phrase vector.

10. The system of claim 9, wherein the application is further configured for:
training the word vector to phrase vector engine with a plurality of sets of word vectors, a plurality of hashtags, and a plurality of tokens to generate a phrase vector space of latent features based on the plurality of sets of word vectors, the plurality of hashtags, and the plurality of tokens.

11. The system of claim 8, wherein the application is further configured for:
scoring, with the unsupervised scoring engine, each identified token of the set of identified tokens using the set of recent tokens prior to the voted token being included in the set of recent tokens,
wherein the unsupervised token has a highest unsupervised score from the set of identified tokens.

12. The system of claim 8, wherein the application is further configured for:
scoring, with the supervised scoring engine, each identified token of the set of identified tokens using the explicit path state that identifies a current path state and the recent path list,
wherein the supervised token has a highest supervised score from the set of identified tokens.

13. The system of claim 8, wherein the application is further configured for:
scoring, with a voting engine, the unsupervised token and the supervised token using a set of saliency weights,
wherein the voted token has a highest voted score from the set of identified tokens.

14. The system of claim 8, wherein the application is further configured for:
updating the set of recent tokens to include the voted token; and
updating the recent path list based on the voted token.

15. One or more non-transitory computer readable mediums comprising computer readable program code for:
converting a user input to a phrase vector;
identifying, by a token identification engine, a set of identified tokens from the phrase vector;
processing the set of identified tokens with an unsupervised scoring engine to select an unsupervised token from the set of identified tokens;
processing the set of identified tokens with a supervised scoring engine to select a supervised token from the set of identified tokens;
selecting a voted token from the unsupervised token selected with the unsupervised scoring engine and the supervised token selected with the supervised scoring engine, wherein the voted token is selected with a machine learning model trained to identify the voted token from the unsupervised token and the supervised token;
identifying a next token based on a set of recent tokens that includes the voted token, wherein identifying the next token comprises:

setting an explicit path state based on the voted token, and identifying, by a next token engine, the next token using the set of recent tokens, the explicit path state, and a recent path list; and presenting the next token as one of a voice communication and an email communication.

16. The one or more non-transitory computer readable mediums of claim 15, further comprising computer readable program code for:

converting, by an input formatting engine, the user input to a text string;

converting, by a text to word vector engine, the text string to a set of word vectors; and converting, by a word vector to phrase vector engine, the set of word vectors to the phrase vector.

17. The one or more non-transitory computer readable mediums of claim 16, further comprising computer readable program code for:

training the word vector to phrase vector engine with a plurality of sets of word vectors, a plurality of hashtags, and a plurality of tokens to generate a phrase vector space of latent features based on the plurality of sets of word vectors, the plurality of hashtags, and the plurality of tokens.

18. The one or more non-transitory computer readable mediums of claim 15, further comprising computer readable program code for:

scoring, with the unsupervised scoring engine, each identified token of the set of identified tokens using the set of recent tokens prior to the voted token being included in the set of recent tokens, wherein the unsupervised token has a highest unsupervised score from the set of identified tokens.

19. The one or more non-transitory computer readable mediums of claim 15, further comprising computer readable program code for:

scoring, with the supervised scoring engine, each identified token of the set of identified tokens using the explicit path state that identifies a current path state and the recent path list, wherein the supervised token has a highest supervised score from the set of identified tokens.

20. The one or more non-transitory computer readable mediums of claim 15, further comprising computer readable program code for:

scoring, with a voting engine, the unsupervised token and the supervised token using a set of saliency weights, wherein the voted token has a highest voted score from the set of identified tokens.

* * * * *